US011886852B1

(12) United States Patent
Suchak et al.

(10) Patent No.: US 11,886,852 B1
(45) Date of Patent: Jan. 30, 2024

(54) APPLICATION COMPOSITION AND DEPLOYMENT

(71) Applicant: Accenture Global Solutions Limited, Dublin (IE)

(72) Inventors: Reeken Jitendra Suchak, Pune (IN); Kanhaiya Prasad Rai, Hyderabad (IN); Samiksha Hariharan, Bangalore (IN); Pramod Kumar Shrivastava, Pune (IN); Trilok Rangan, Chalakudy (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 18/070,877

(22) Filed: Nov. 29, 2022

(51) Int. Cl.
*G06F 17/00* (2019.01)
*G06F 9/46* (2006.01)
*G06F 9/50* (2006.01)
*G06F 8/60* (2018.01)
*G06F 8/30* (2018.01)

(52) U.S. Cl.
CPC . *G06F 8/60* (2013.01); *G06F 8/31* (2013.01)

(58) Field of Classification Search
CPC ... G06F 8/60; G06F 8/31; G06F 17/20; G06F 17/21
USPC ........................................................ 709/203
See application file for complete search history.

(56) References Cited

U.S. PATENT DOCUMENTS

| 7,665,064 | B2* | 2/2010 | Able | G06Q 10/10 717/117 |
|---|---|---|---|---|
| 11,327,724 | B2* | 5/2022 | Nasu | G06F 8/77 |
| 11,394,640 | B2* | 7/2022 | Ramaswamy | H04L 45/20 |
| 2008/0209392 | A1* | 8/2008 | Able | G06F 8/34 717/105 |
| 2009/0265611 | A1* | 10/2009 | Sengamedu | G06F 16/9577 715/234 |
| 2010/0332410 | A1* | 12/2010 | Brown | G06Q 20/29 705/37 |
| 2011/0258187 | A1* | 10/2011 | DelRocco | G06F 16/951 707/E17.014 |
| 2015/0095847 | A1* | 4/2015 | Kleinhout | G06F 3/0486 715/838 |
| 2015/0365491 | A1* | 12/2015 | Chan | H04N 21/4335 709/219 |
| 2015/0373107 | A1* | 12/2015 | Chan | H04L 67/1095 709/205 |

(Continued)

Primary Examiner — Jude Jean Gilles
(74) Attorney, Agent, or Firm — Fish & Richardson P.C.

(57) ABSTRACT

Implementations are directed to configuring a set of applications and one or more modules associated with each application, wherein the one or more modules of an application comprise functional components that are bundled into the application, wherein each application is associated with a site of an on-premise system where the application is to be deployed; creating a process flow that includes a plurality of nodes, each node corresponding to a process executed at the site; associating a collection of applications to each node included in the process flow, wherein the collection of applications are selected from the set of applications, wherein the set of applications are categorized based on a relevance score of each application; and deploying the process flow and the collection of applications associated with each node to corresponding on-premise edge devices of the on-premise system based on the site of each application.

24 Claims, 7 Drawing Sheets

(56) References Cited

U.S. PATENT DOCUMENTS

2016/0378439 A1* 12/2016 Straub ................ G06F 8/61
　　　　　　　　　　　　　　　　　　　　717/107
2020/0177478 A1* 6/2020 Dakshinyam ....... G06F 16/1824

* cited by examiner

APPLICATION COMPOSITION AND DEPLOYMENT

BACKGROUND

Large-scale industry processes can include software applications executing across numerous sites and in various use cases. The applications can run within on-premise systems and cloud systems. An on-premise system refers to on-premise applications that are executed locally by enterprises within an enterprise network owned and operated by the enterprise (e.g., applications provided in a so-called edge deployment). A cloud system refers to cloud-based applications that are hosted within a cloud platform (e.g., software-as-a-service (SaaS) applications). There are efforts to migrate workloads from on-premise systems to cloud systems. While such migration is achievable and brings scale to functionalities, not all use cases can run from a cloud system. For example, certain critical applications have constraints like plant security restrictions, use case availability to a local plant or line operator, low latency, complete offline usage, and the like. Such constraints require certain use cases and applications to run locally on the on-premise system.

SUMMARY

Implementations of the present disclosure are generally directed to composing and deploying applications inside on-premise systems, such as resource constraint infrastructure like edge devices of one or more plants of the on-premise systems. The application composition and deployment system of the present disclosure can configure a set of applications to be deployed to the on-premise system, and seamlessly synchronize the applications from the cloud system to the on-premise system. The application composition and deployment system of the present disclosure can support high availability and scalability of the composed applications with minimum latency in a resource constrained infrastructure.

As described in further detail herein, the application composition and deployment system of the present disclosure can configure a set of applications that are reusable. Each application is configured with one or more modules and associated with a site where the application is to be deployed. The application composition and deployment system can create a process flow that includes a plurality of processes. Each process corresponds to a node in the process flow. The application composition and deployment system can associate a collection of applications to each node included in the process flow. In some implementations, a process included in the process flow can be a workflow that includes a plurality of sub-processes. A sub-process can be another workflow in a deeper level. The application composition and deployment system can create a process hierarchy for the workflow with multiple levels. The application composition and deployment system can associate a collection of applications to each process or sub-process in the process flow that includes the process hierarchy. The application composition and deployment system can deploy the process flow and the collection of applications associated with each node to corresponding edge devices of the on-premise system based on the site of each application.

In some implementations, actions include configuring a set of applications and one or more modules associated with each application, wherein the one or more modules of an application comprise functional components that are bundled into the application, wherein each application is associated with a site of an on-premise system where the application is to be deployed; creating a process flow that includes a plurality of nodes, each node corresponding to a process executed at the site; associating a collection of applications to each node included in the process flow, wherein the collection of applications are selected from the set of applications, wherein the set of applications are categorized based on a relevance score of each application; and deploying the process flow and the collection of applications associated with each node to corresponding on-premise edge devices of the on-premise system based on the site of each application. Other implementations of this aspect include corresponding systems, apparatus, and computer programs, configured to perform the actions of the methods, encoded on computer storage devices.

These and other implementations can each optionally include one or more of the following features, alone or in combination. In some implementations, the actions include collecting user interactions with each application; and updating the relevance score of each application based on the user interactions.

In some implementations, configuring a set of applications includes: creating a JSON file for each application, the JSON file comprising the application, the one or more modules of the application, and the site information; merging the JSON file with a base deployment manifest JSON file to obtain a final consolidated manifest JSON file that is to be deployed to the on-premise edge devices of the on-premise system.

In some implementations, the actions include transforming a data structure of the process flow and the collection of applications associated with each node into composed JSON files.

In some implementations, a node included in the process flow comprises a collection of applications. In some implementations, a node included in the process flow comprises a workflow that includes a plurality of sub-processes, wherein a sub-process comprises a collection of applications.

In some implementations, the relevance score of an application is determined based on a weighted combination of an access factor and an engagement factor, the access factor of the application indicates a ratio of an access frequency of the application over a sum of the access frequencies of all of the set of applications, and the engagement factor of the application indicates a ratio of meaningful transactions within the application over a sum of meaningful transactions within all of the set of applications.

In some implementations, the set of applications are categorized into a first set including applications having relevance scores satisfying a threshold, and a second set including applications having relevance scores not satisfying the threshold.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

Implementations of the present disclosure are generally directed to composing and deploying applications inside on-premise systems, such as resource constraint infrastructure like edge devices of one or more plants of the on-premise systems. The application composition and deployment system of the present disclosure can configure a set of applications to be deployed to the on-premise system, and seamlessly synchronize the applications from the cloud system to the on-premise system. The application composition and deployment system of the present disclosure can support high availability and scalability of the composed applications with minimum latency in a resource constrained infrastructure.

As described in further detail herein, the application composition and deployment system of the present disclosure can configure a set of applications that are reusable. Each application is configured with one or more modules and associated with a site where the application is to be deployed. The application composition and deployment system can create a process flow that includes a plurality of processes. Each process corresponds to a node in the process flow. The application composition and deployment system can associate a collection of applications to each node included in the process flow. In some implementations, a process included in the process flow can be a workflow that includes a plurality of sub-processes. A sub-process can be another workflow in a deeper level. The application composition and deployment system can create a process hierarchy for the workflow with multiple levels. The application composition and deployment system can associate a collection of applications to each process or sub-process in the process flow that includes the process hierarchy. The application composition and deployment system can deploy the process flow and the collection of applications associated with each node to corresponding edge devices of the on-premise system based on the site of each application.

In some implementations, actions include configuring a set of applications and one or more modules associated with each application, wherein the one or more modules of an application comprise functional components that are bundled into the application, wherein each application is associated with a site of an on-premise system where the application is to be deployed; creating a process flow that includes a plurality of nodes, each node corresponding to a process executed at the site; associating a collection of applications to each node included in the process flow, wherein the collection of applications are selected from the set of applications, wherein the set of applications are categorized based on a relevance score of each application; and deploying the process flow and the collection of applications associated with each node to corresponding on-premise edge devices of the on-premise system based on the site of each application.

Figure 1:
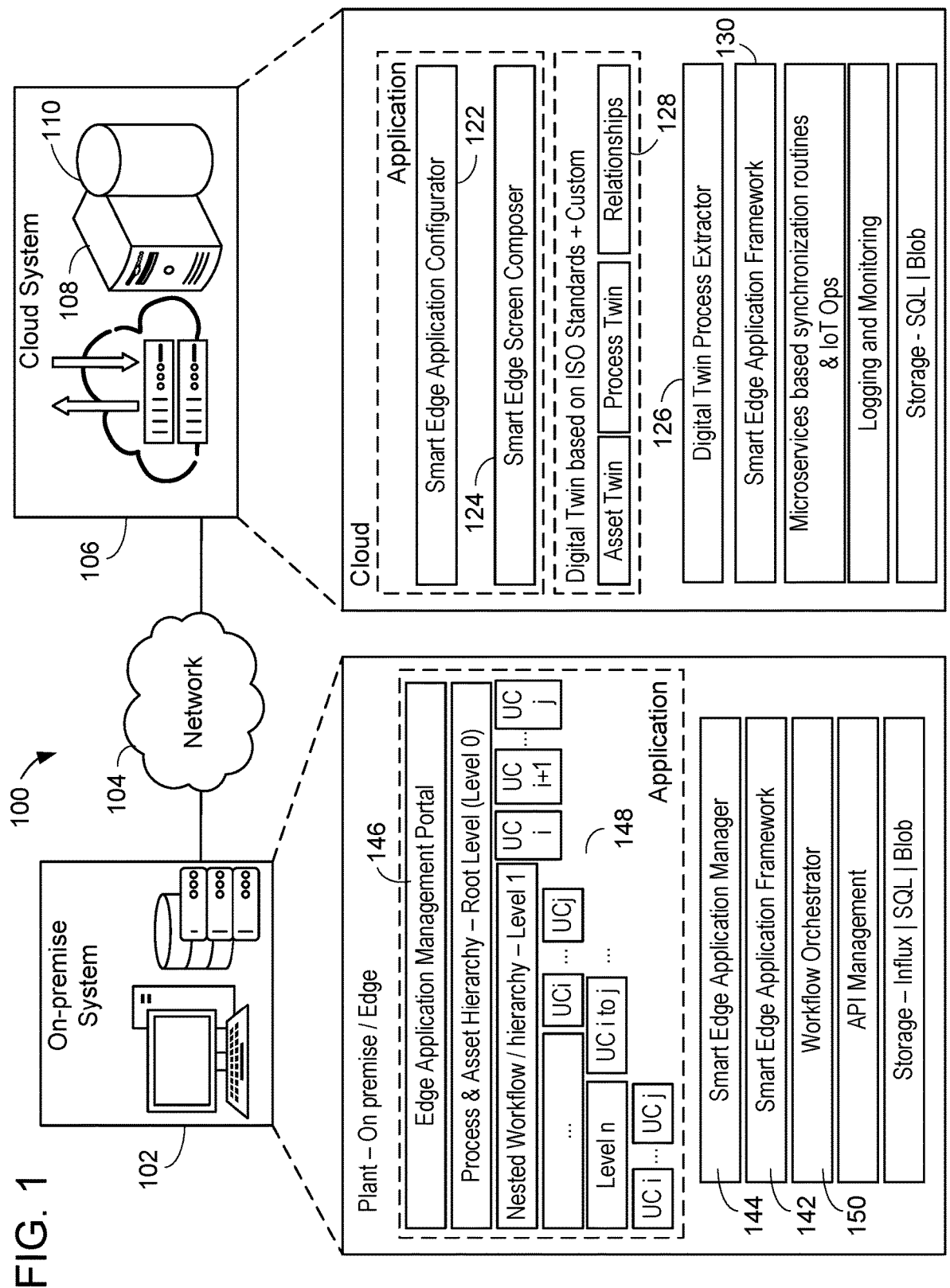
FIG. 1 depicts an example system that can execute implementations of the present disclosure.

FIG. 1 depicts an example system 100 that can execute implementations of the present disclosure. The example system 100 includes an on-premise system 102, a network 104, and a cloud system 106.

The on-premise system 102 can be a system initially located in a local on-premise infrastructure of a customer, such as organizations or enterprises. In a non-limiting, example context, the customer enterprise can include a plurality of sites and an example site can include a plant. For example, each plant can be a manufacturing plant at a particular locale (e.g., city, state, province, region), within which one or more industrial processes are performed. The on-premise system can include a plurality of site systems, each site system being specific to a respective site. Each site system can belong to a certain business unit of an enterprise. Each site system can include a set of attributes or features, such as an area and processes to be operated at the site.

The on-premise system 102 can include an edge server, data store (e.g., databases), and a set of on-premise edge devices. The set of on-premise edge devices in different sites can be different and used for different functions or processes. The on-premise edge devices can be resource constraint devices or infrastructures.

The on-premise system 102 can include a set of databases, applications, services, and workloads. In some implementations, at least part of the on-premise system is migrated to the cloud system 106. However, not all applications, services, use cases, or processes can be executed from the cloud. For example, certain critical applications have constraints like sitesecurity restrictions, use case availability to a local plant or a line operator, low latency, complete office usage, and the like. Such applications need to be executed on the on-premise system.

The cloud system 106 can compose applications to be deployed inside the on-premise systems on the edge devices, at least some of which are resource-constrained. The cloud system 106 includes at least one server system 108, and data store 110 (e.g., database). In some examples, at least one server system 108 hosts one or more computer-implemented services (e.g., application configuration, process flow composing, etc.) in accordance with implementations of the present disclosure.

In some examples, the network 106 includes a local area network (LAN), wide area network (WAN), the Internet, or a combination thereof, and connects the on-premise system 102 and the cloud systems 106. In some examples, the network 106 can be accessed over a wired and/or a wireless communication link.

The cloud system 106 can include a smart edge application configurator 122 to create and configure a set of applications and one or more modules associated with each application. The cloud system 106 can associate each application with a site where the application is to be deployed.

The cloud system 106 can include a digital twin process extractor 126 to create a process flow that can be represented in a graph structure that includes a plurality of nodes and edges between nodes. Each node can correspond to a process included in the process flow and each edge can represent a relationship between processes (e.g., an order of execution).

For example, the cloud system 106 can access a document of the customer that describes the process of manufacturing a certain product. The cloud system 106 can determine the assets, processes, and relationships of the assets and the processes 128 based on the manufacturing process described in the document. The cloud system 106 can determine the process flow based on the assets, processes, and relationships of the assets and the processes 128. Each node included in the process flow can be either a workflow or a collection of applications. If a node is a workflow, the node can include a plurality of sub-processes. The digital twin process extractor 126 can perform depth first traversal to create the workflow inside the node. In some implementations, and assuming that the workflow includes n levels, the digital twin process extractor 126 can create another workflow for a next level, until reaching the deepest level (e.g., level n). The multi-level process flow can be a process hierarchy including nested workflows.

The cloud system 106 can include a smart edge screen composer 124 to associate a collection of applications to each node included in the process flow. The collection of applications can be selected from the set of applications that are created using the smart edge application configurator 122. When the process flow includes a process hierarchy with multiple levels, this composing process can be repeated for every process or workflow recursively to keep nested screens (e.g., home screen→screen 1→screen 2→ . . . →screen s→application collection). Each screen can correspond to a process that can be a workflow or an application collection. The composing recurs until an application collection is created or is associated with a corresponding process or sub-process (e.g., reaching the deepest level).

Figure 3A:
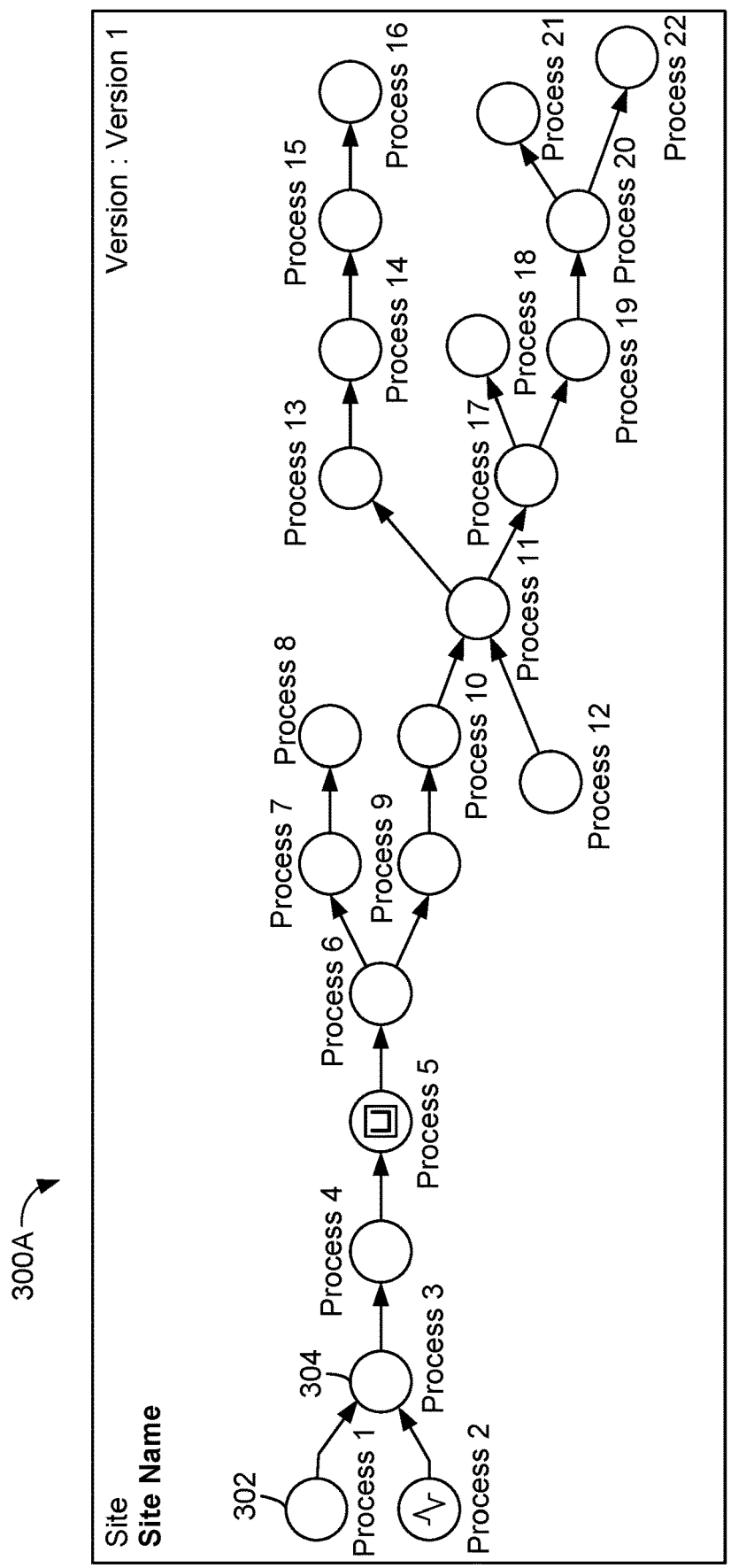
FIG. 3A depicts a process flow in accordance with implementations of the present disclosure.
Figure 3B:
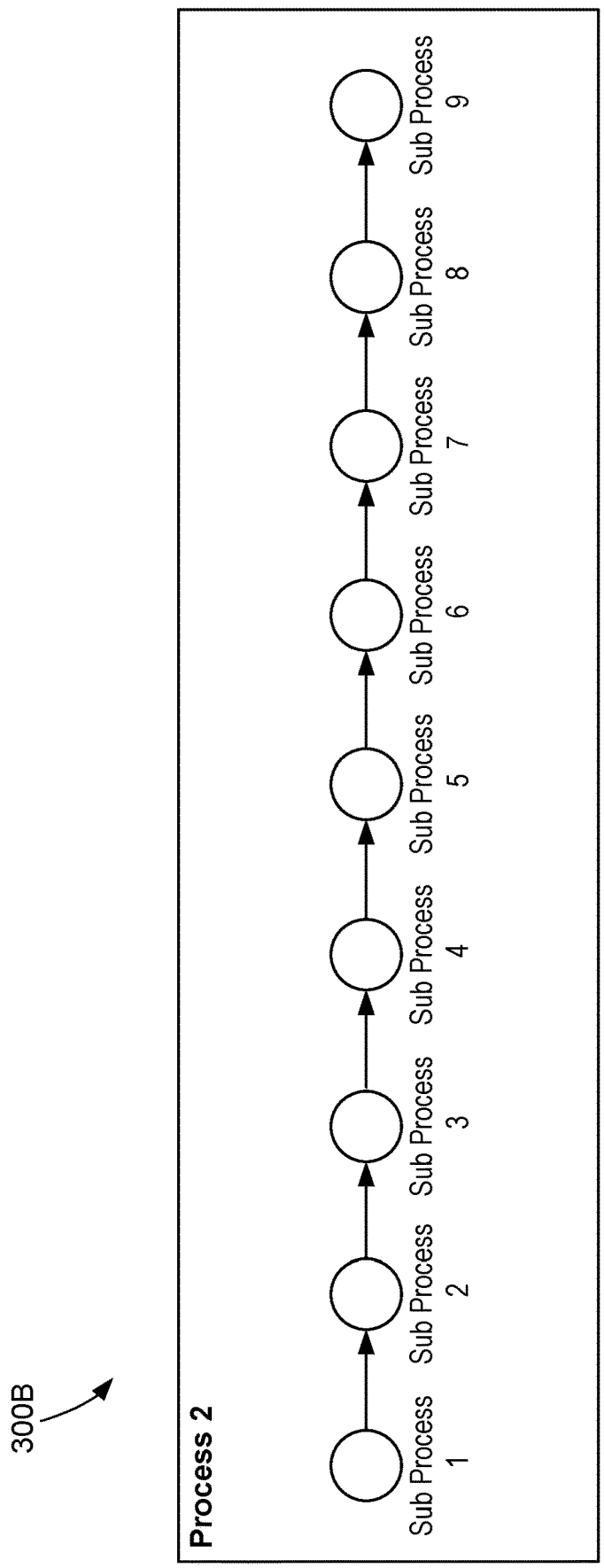
FIG. 3B depicts a workflow included within a node of the flow process in accordance with implementations of the present disclosure.
Figure 3C:
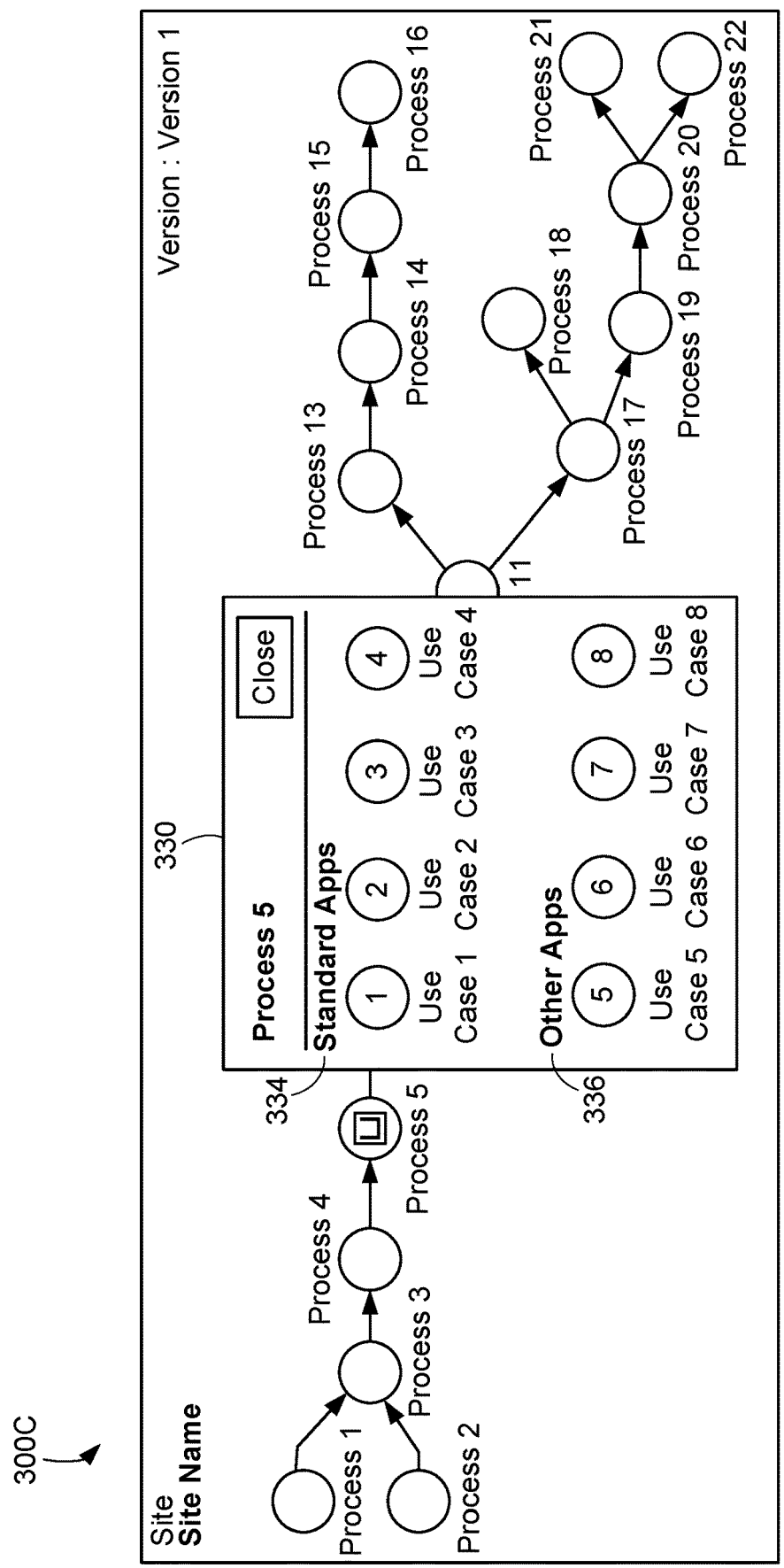
FIG. 3C depicts a process of attaching applications to a node included in the process flow in accordance with implementations of the present disclosure.
Figure 4:
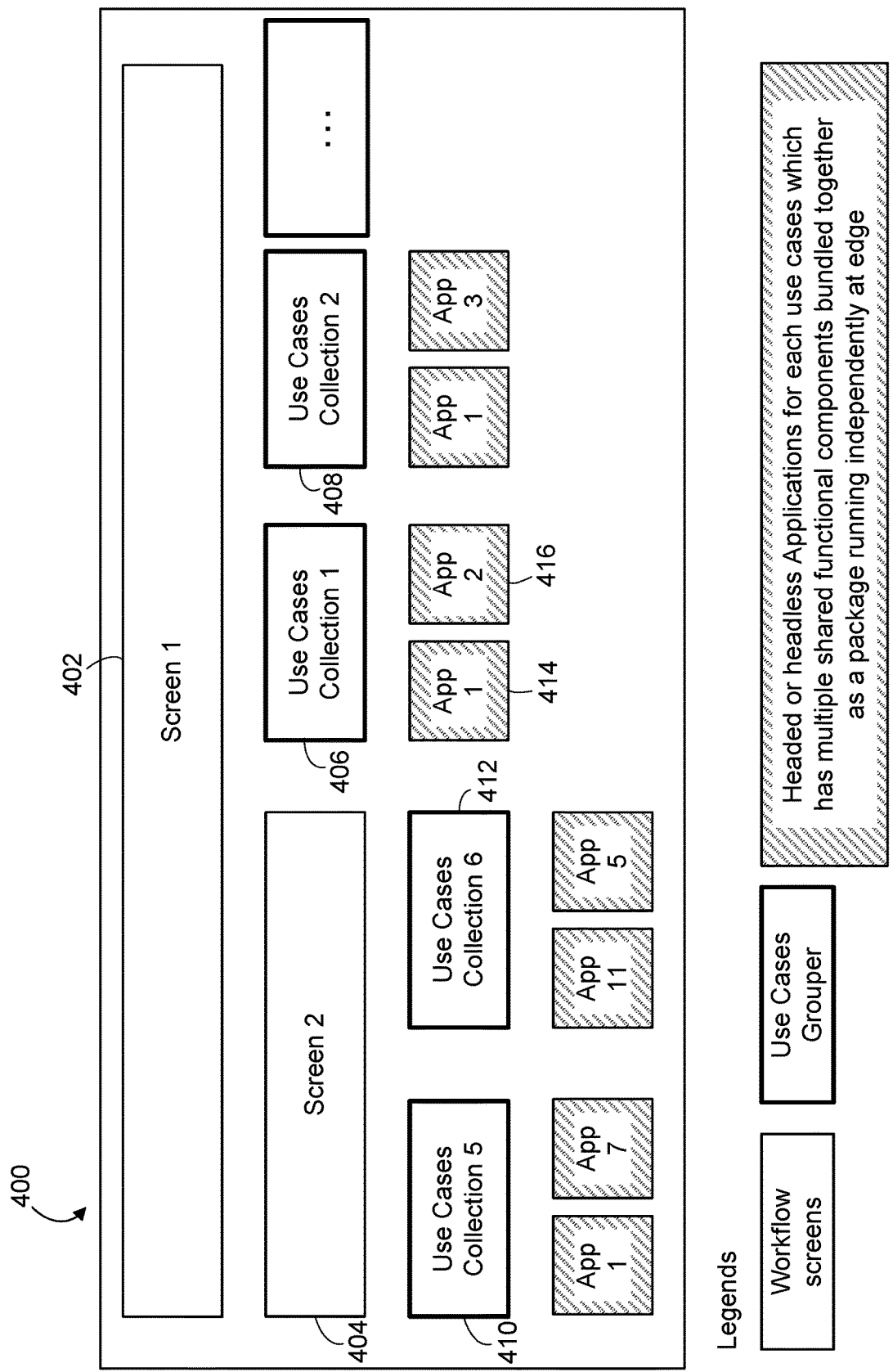
FIG. 4 depicts a process hierarchy included in a process flow in accordance with implementations of the present disclosure.

The cloud system 106 can include a smart edge application framework 130 to deploy the process flow and the collection of applications associated with each node. The smart edge application framework 130 on the cloud system 106 can ensure that the applications are also synchronized to the edge devices. The smart edge application framework 130 can notify the on-premise system 102 to pull and deploy the latest JSON files of the updated applications from the cloud system 106. FIGS. 2-4 and associated descriptions provide additional details of these implementations.

The on-premise system 102 can include a smart edge application framework 142. The smart edge application framework 142 on the on-premise system 102 can receive the latest JSON files of the applications from the smart edge application framework 130 of the cloud system 106.

The on-premise system 102 can include a smart edge application manager 144. The smart edge application manager 144 can refresh a workflow orchestrator 150 which uses the JSON files in the smart edge application framework 142 of the on-premise system to update the application programming interfaces (APIs) locally.

The on-premise system 102 can include an edge application management portal 146. The edge application management portal 146 can render and deploy the applications on corresponding edge devices of the on-premise system 102. The edge application management portal 146 is updated and refreshed with the latest version of the latest files synchronized by the smart edge application framework 142.

As a result, the process flow and the associated applications can be deployed on the on-premise system 102. The process flow can include a process hierarchy 148 that is created by the digital twin process extractor 126. Each process or sub-process included in process hierarchy 148 can be associated with a collection of applications composed by the smart edge screen composer 124. The process hierarchy 148 can include nested workflows. The process hierarchy 148 can include multiple levels, such as n levels (e.g., n levels). FIGS. 2-4 and associated descriptions provide additional details of these implementations.

Figure 2A:
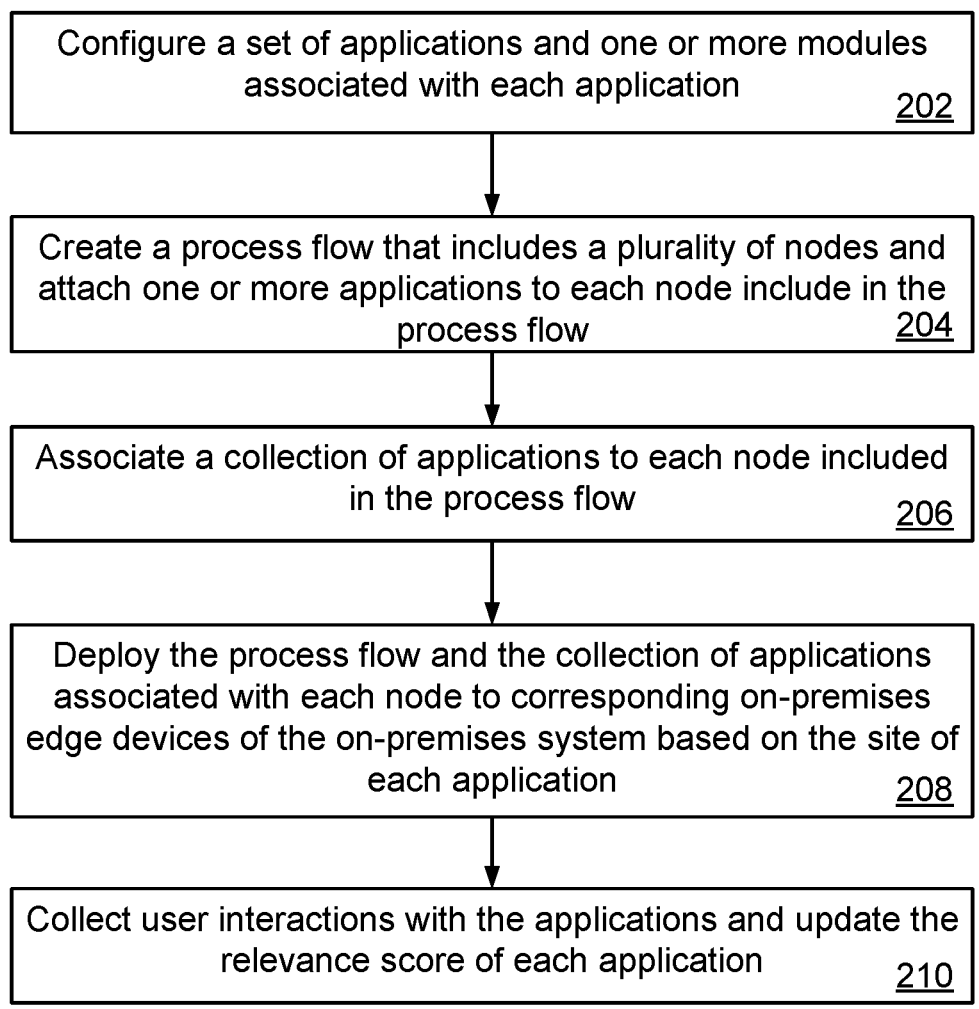
FIG. 2A depicts an example flow process of application composition and deployment that can be executed in accordance with implementations of the present disclosure.

FIG. 2A depicts an example flow process of application composition and deployment that can be executed in accordance with implementations of the present disclosure. The example process 200A can be implemented by the cloud system 106 shown in FIG. 1. In some examples, the example process 200A is provided using one or more computer-executable programs executed by one or more computing devices.

At step 202, the cloud system can configure a set of applications and one or more modules associated with each application. The one or more modules of an application can be functional components that are bundled into an application package of the application. Each application can be associated with a site of the on-premise system where the application is to be deployed.

An application can correspond to a certain process or use case. For example, in chocolate manufacturing, an application can correspond to roasting cocoa beans. Another application can correspond to formulation. The chocolate manufacture company can include a set of plants that are located in different locations. Each plant can have different lines, operators, and machines. As a result, the application at a particular plant can be based on the functions, operations, and machines of the particular plant. For example, the application for roasting the cocoa beans can be deployed at site A. The application for formulation can be deployed at site B.

The cloud system can receive a newly created application. In some implementations, the cloud system can allow a user (e.g., an administrative user) to create a new application for deployment at a site. For example, the cloud system can generate a graphical user interface (GUI) that allow the user to input an application name. The cloud system can receive an application name created by the user. The application name can be selected by the user from a list of applications.

The cloud system can receive one or more modules associated with the new application. For each application, the cloud system can allow the user to associate the application with one or more modules. For example, the cloud system can generate a GUI that includes a list of application names for the user to select. The GUI can further include a list of modules for the user to select. The user can select an application name and one or more modules associated with the selected application via the GUI. The cloud system can therefore receive the application name and the one or more modules for the selected application.

Furthermore, the cloud system can receive a site associated with the new application. The cloud system can allow the user to associate the application with a site. For example, the cloud system can generate a GUI that includes a list of application names for the user to select. The GUI can further include a list of sites for the user to select. The user can select an application name and a site associated with the selected application via the GUI. The cloud system can therefore receive the application name and the site for the selected application.

In some implementations, the cloud system can allow the user to update existing applications. The user can add or modify modules to the applications.

The cloud system can also create a complete application JSON structure including the application, modules, and site information (e.g., site details which the user has selected). The cloud system can merge the application JSON with a base deployment manifest JSON file to obtain a final consolidated deployment manifest JSON, which will be deployed in the plant on-premise edge devices.

At step 204, the cloud system can create a process flow that includes a plurality of nodes. Each node can correspond to a process included in the process flow.

The cloud system can determine the process flow as articulated by the enterprise, such as the chocolate manufacture enterprise. In some implementations, the cloud system can access a certain database to access any digital document that describes the manufacturing process and determine the process flow. The process flow can include a plurality of nodes, with each node representing a process included in the process flow. For example, in the process flow for making chocolate, a first process can be cleaning raw cocoa beans. A second process can be roasting the cocoa beans.

In some implementations, the cloud system can use a digital twin process extractor (e.g., the digital twin process extractor 126 of FIG. 1, also referred to herein as an extractor) to determine the process flow. The extractor can perform a breadth-first traversal from the first process to the last process. The extractor can recursively perform depth-first traversal for every process, until JSONs are created for every process and its sub-processes. For example, FIG. 3A depicts a process flow 300A in accordance with implementations of the present disclosure. The extractor can first perform a breath first traversal to create the process flow 300A that includes 22 processes. In the process flow 300A, each node can represent a process, each edge can represent a relationship between two nodes. For instance, a relationship between process 1 302 and process 3 304 can indicate that process 1 302 is a prerequisite process and process 3 304 is a subsequent process. The prerequisite process 302 is classified as a proceeding step that precedes the subsequent process 304. The subsequent process 304 is classified as a subsequent step that follows the prerequisite process 302.

Each node included in the process flow can be either a workflow or a collection of applications. If a node included in the process flow is a workflow, the workflow can include a plurality of sub-processes. A sub-process can include a collection of applications. The extractor can perform depth-first traversal to create the workflow inside the node. In some implementations, and assuming the workflow includes n levels, the extractor can create another workflow for a next level, until reaching the deepest level (e.g., level n). For example, FIG. 3B depicts a workflow 300B included within a node of the flow process in accordance with implementations of the present disclosure. Process 2 is a workflow node in the process flow. The extractor can create a workflow 300B that includes the plurality of sub-processes (e.g., 9 sub-processes). Each sub-process can be either another workflow or a collection of applications. If a sub-process is another workflow, the extractor can further create another workflow including another set of sub-processes. The extractor can recursively perform such a process up to the deepest level, until each node in the workflow represents a collection of applications.

The digital twin process extractor of the cloud system extracts processes and sub-processes from a digital twin hierarchy using customized depth first algorithm where process and sub-process relationships are made known in the ontology. The outcome is made available as JSONs of process and sub-process with the Level and node of origination. The following example algorithm can be provided:

Step 1: Start depth first traversal from root of a digital twin (aka asset hierarchy) (traverse to leaf)

Step 2: If the currently traversed node is not processed before and it has a relationship which is identified either as a process or sub-process relationship (like material flow, gives, feeds etc.) then execute inner loop in step 3

Step 2.1: Navigate the graph nodes using process or sub-process direction until there are no more relationships, recording each node in order). Record the data as JSON, add the path in step 3 to the JSON (to know the origination node). Exit Step 3: If the currently traversed node is not processed before and it doesn't have a relationship which is identified either as a process or sub-process relationship (like material flow, gives, feeds etc.)

Step 4: Mark node as processed

Step 5: Go back to step 1 with the current node as the new root node

Step 4: Run the algorithm until all nodes are processed.

Step 5: Once this is completed, all processes and sub-processes are created as separate JSONs with their origination node with the ontology path.

Step 6: Then these files are merged by cloud system to create asset hierarchy to ontology JSONs.

At step 206, the cloud system can associate a collection of applications to each node included in the process flow. The collection of applications can be selected from the set of applications that are created in step 202. The set of applications can be categorized based on a relevance score of each application.

Once each process and sub-processes are extracted, it is made available to screen composer user interface (UI). In the screen composer UI, the cloud system can attach a process with a sub-process up to n levels or to applications. The cloud system can receive a collection of applications to be attached to a process or a sub-process. FIG. 3C depicts a process 300C of attaching applications to a node included in the process flow in accordance with implementations of the present disclosure. For example, when process 5 in the process flow is selected in the UI, the cloud system can generate a GUI 330 for selecting the collection of applications for process 5. As shown in FIG. 3C, the GUI 330 can include the set of applications that are created in step 202 for the user to select. The cloud system can receive the selected applications and associate the selected applications with the corresponding process.

The composing process can be repeated for every process or workflow recursively to keep nested screens (e.g., home screen→screen 1→screen 2→ . . . →screen s→application collection). Each screen is corresponding to a process that can be a workflow or an application collection. The composing recurs until an application collection is created or associated with a corresponding process or sub-process.

FIG. 4 depicts a process hierarchy 400 included in a process flow in accordance with implementations of the present disclosure. As discussed above, the process flow can include a plurality of nodes. Each node can be a workflow or a collection of applications (also referred to as an application collection, or a use case collection). As shown in FIG. 4, one of the nodes in the process flow is a workflow represented by screen 1 402 which includes a set of sub-processes, such as screen 2 404, use case collection 1 406, use case collection 2 408, etc. The sub-process represented by screen 2 404 is another workflow in a deeper level. Screen 2 404 can include another set of sub-processes in the deeper level. For example, screen 2 can include another set of sub-processes: user case collection 5 410 and use case collection 6 412. Each use case collection includes a collection of applications. For example, use case collection 1 406 can include application 1 414 and application 2 416.

The list of applications included in the GUI 330 can be categorized into two types: standard applications 334 and other applications 336. The standard applications 334 can include applications that are frequently interacted with meaningful engagement. In some implementations, each application is associated with a relevance score. The standard applications 334 include applications whose relevance score satisfying a threshold. The other applications 336 include applications whose relevance score not satisfying the threshold. In some implementations, the list of applications in each category can be ordered based on the relevance score of each application. For example, the applications with higher relevance scores can be presented in front of the applications with lower relevance scores.

The cloud system can transform the data structure of the process flow and the collection of applications associated with each node into composed JSON files. As discussed above, the cloud system can also create a complete application JSON structure comprising the application, modules, and site information (e.g., site details which the user has selected). The cloud system can merge the application JSON with a base deployment manifest JSON file to obtain a final consolidated deployment manifest JSON, which will be deployed in the plant on-premise edge devices.

At step 208, the cloud system can deploy the process flow and the collection of applications associated with each node to corresponding on-premise edge devices of the on-premise system based on the site of each application.

The cloud system can include a smart edge application framework used for the deployment. The smart edge application framework on the cloud can cache and keep the various JSON files. The smart edge application framework can ensure that JSON files are also synchronized to the edge devices of the on-premise system.

In some implementations, the smart edge application framework can include an Internet of things (IoT) hub that notifies the on-premise system to pull and deploy the latest updated applications from the smart edge application framework on the cloud, so that the JSON files are synchronized from the cloud to the on-premise edge devices.

In some implementations, an edge server of the on-premise system can use a workflow orchestrator to distribute or deploy the processes and the associated applications to different edge devices in different plants at different areas or locations. Furthermore, the edge server can use an edge application management portal to render and update the connection between user interfaces, Application/Business Logic, APIs, and storage links, of different processes and applications. After distribution, an application of a particular process can be running on a corresponding edge device. A user (e.g., an operator of a particular process or use case) can interact with the application.

At step 210, the cloud system can collect user interactions with the applications and update the relevance score of each application based on the user interactions. As discussed above, each application is associated with a relevance score. The relevance score can be determined based on user interactions with the applications. For example, the relevance score of an application can be based on a frequency of accessing the application and a number of meaningful transactions within the application.

After the applications are deployed on the edge devices of one or more plants of the on-premise system, a user (e.g., an operator of a site) can interact with the applications. In some implementations, an edge server can collect the user interaction data and send the user interaction data to the cloud system.

It can be assumed that there are n applications in the set of applications, such as $M=\{m_1, m_2, \ldots m_n\}$. If a user (e.g., an operator of the plant) spends a certain time, such as S seconds, on an application $m_i$ before return to a previous interface or a home portal, the access frequency of application $m_i$ is increased by 1. The cloud system can determine an access factor $Ac(m_i)$ for application $m_i$. The access factor $Ac(m_i)$ can be the ratio of the access frequency of $m_i$ over the sum of the access frequencies of all applications M. The following example relationship can be provided:

$$Ac(m_i) = \frac{\text{access frequency of } m_i}{\sum_{k=1}^{n} \text{access frequency of } m_k}.$$

In addition, the cloud system can determine an engagement factor $En(m_i)$ for application $m_i$. The engagement factor $En(m_i)$ can be the ratio of the meaningful transactions within application $m_i$ over the sum of meaningful transactions within all applications M. The following example relationship can be provided:

$$En(m_i) = \frac{\text{meaningful transactions within } m_i}{\sum_{k=1}^{n} \text{meaningful transaction within } m_k}.$$

The meaningful transactions within application $m_i$ can include at least one database call or at least an internal application programming interface (API) call is triggered using application $m_i$. When a meaningful transaction within an application is triggered based on the user interaction, the cloud system can increase a counter for meaningful transactions by 1. By counting the meaningful transactions, the cloud system can more accurately estimate user engagement with the application. For example, if a user simply clicked on an application and then exited the application, the cloud system will not count the user interaction as a meaningful transaction.

After determining the access factor $Ac(m_i)$ and the engagement factor $En(m_i)$, the cloud system can determine the relevance score $RS(m_i)$ for application $m_i$, based on a weighted combination of the access factor $Ac(m_i)$ and the engagement factor $En(m_i)$. The following example relationship can be provided:

$$RS(m_i) = \alpha * Ac(m_i) + \beta * En(m_i)$$

where $\alpha$ and $\beta$ are weight values, and $\alpha+\beta=1$. The values of $\alpha$ and $\beta$ can be predetermined values. In some embodiments, the values of $\alpha$ and $\beta$ can be adjusted. The values of $\alpha$ and $\beta$ can be determined based on a set of importance weightage rules.

The cloud system can use the relevance score of each application to categorize the set of applications into two sets, such as standard applications or other applications. As discussed above, the standard applications include applications whose relevance scores satisfy a threshold. The other applications include applications whose relevance scores do not satisfy the threshold. The list of applications in each category can be ordered based on the relevance score of each application. By categorizing and ordering the applications using the corresponding relevance scores in a GUI shown in FIG. 3C, the cloud system can enable the user to more efficiently identify the applications to be attached with one or more processes.

The order of steps in the process 200A described above is illustrative only, and the process 200A can be performed in different orders. In some implementations, the process 200A can include additional steps, fewer steps, or some of the steps can be divided into multiple steps.

Figure 2B:
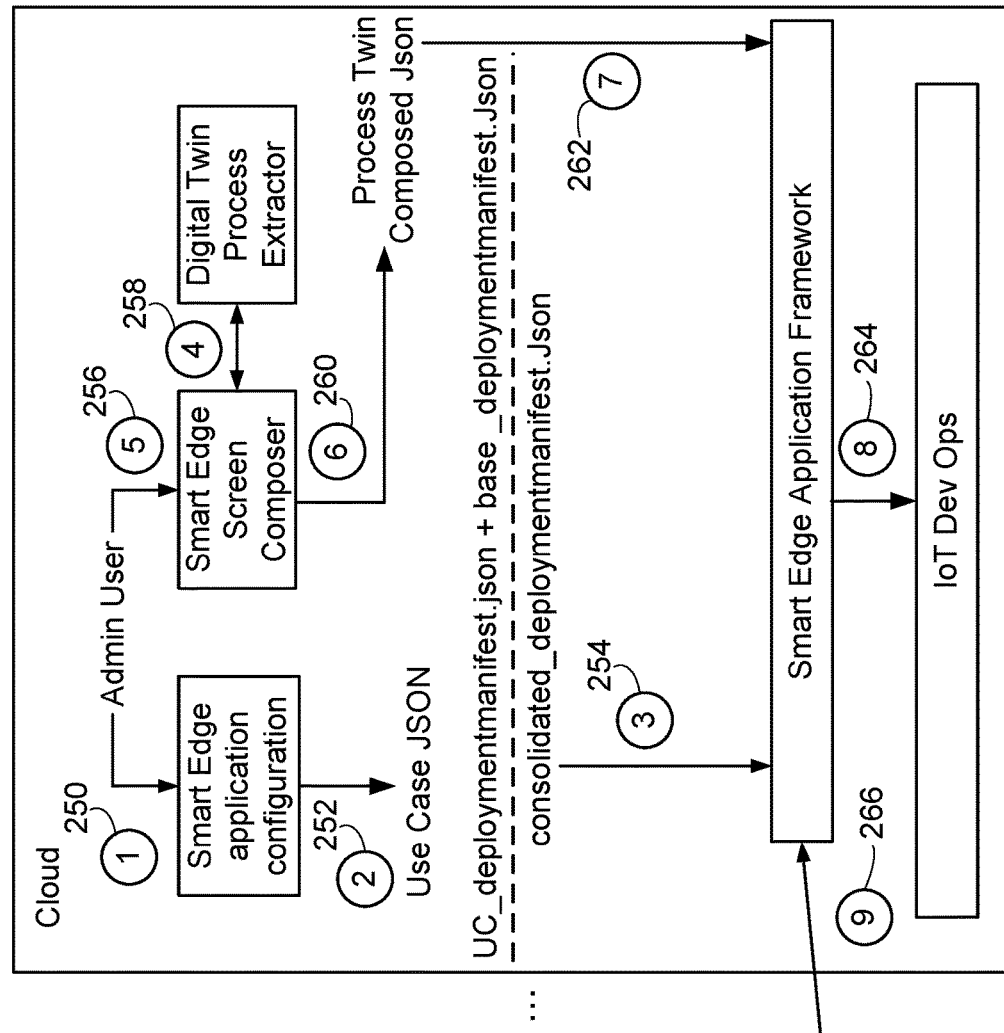
FIG. 2B depicts an example block process of application composition and deployment that can be executed in accordance with implementations of the present disclosure.
Figure 2B:
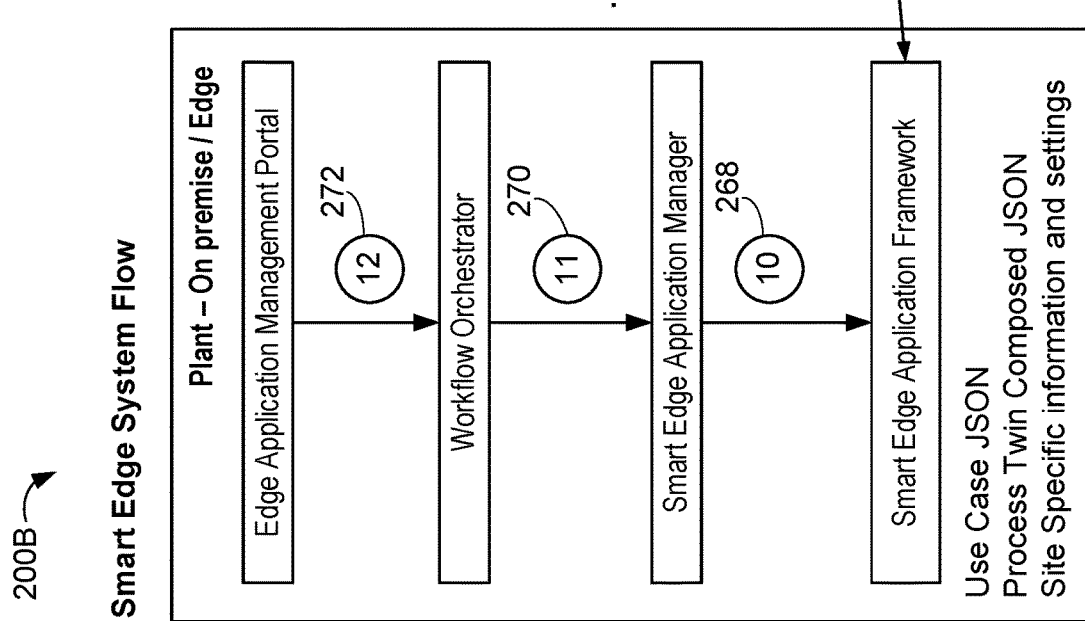

FIG. 2B depicts an example block process of application composition and deployment that can be executed in accordance with implementations of the present disclosure.

In step 1 250, the cloud system can use the smart edge application configurator to configure the set of applications. The cloud system can allow a user (e.g., an administrative user) to create a new application. The cloud system can receive one or more module associated with the new application that are selected by the user. The cloud system can receive a site associated with the new application based on the user input.

In step 2 252, the cloud system can create a complete application JSON structure including the application, modules, and site details which the user has selected. The system can merge the application JSON with a base deployment manifest JSON file to obtain a final consolidated deployment manifest JSON, which will be deployed in the plant on-premise edge devices.

In step 3 254, the cloud system can cache and keep the various JSON files for the set of applications in the smart edge application framework on the cloud.

In step 4 256, a process flow is created by the digital twin process extractor. In step 5 258, the cloud system can use the smart edge screen composer to associate a collection of applications to each node included in the process flow. The cloud system can allow the user (e.g., administrative user) to select a collection of applications for each node in the process flow.

In step 6 260, the cloud system can transform the data structure of the process flow and the associated application collections into process twin composed JSON files.

In step 7 262, the cloud system can cache and keep the composed JSON files for the process flow and the associated applications in the smart edge application framework on the cloud.

In step 8 264, the smart edge application framework on the cloud system can manage the automated and self-adjusting IoT DevOps pipeline, once the user decides to deploy applications and the process flow from the smart edge application configurator and the smart edge screen composer.

In step 9 266, the smart edge application framework on the on-premise system can receive the latest JSON files (e.g., JSON files for the set of applications, the composed JSON files for the process flow and the associated applications) from the smart edge application framework of the cloud.

In steps 10 268 and 11 270, a smart edge application manager on the on-premise system can refresh workflow orchestrator which uses the JSON files in the smart edge application framework of the on-premise system to update the application programming interfaces (APIs) locally.

In step 12 272, once JSONs are updated on the on-premise system, the edge application management portal is also refreshed for rendering. The connection between user interfaces, Application/Business Logic, APIs and storage links are updated. The edge application management portal is updated and refreshed with the latest version of the latest files synchronized by the smart edge application framework in step 9 266.

The order of steps in the process 200B described above is illustrative only, and the process 200B can be performed in different orders. In some implementations, the process 200B can include additional steps, fewer steps, or some of the steps can be divided into multiple steps.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for deploying applications from a cloud system to one or more on-premise systems, the method comprising:
    configuring, by one or more computing devices, a set of applications and one or more modules associated with each application, wherein the one or more modules of an application comprise functional components that are bundled into the application, wherein each application is associated with a site of an on-premise system where the application is to be deployed;
    creating, by the one or more computing devices, a process flow that includes a plurality of nodes, each node corresponding to a process executed at the site;
    associating, by the one or more computing devices, a collection of applications to each node included in the process flow, wherein the collection of applications are selected from the set of applications, wherein the set of applications are categorized based on a relevance score of each application; and
    deploying, by the one or more computing devices, the process flow and the collection of applications associated with each node to corresponding on-premise edge devices of the on-premise system based on the site of each application.

2. The computer-implemented method of claim 1, further comprising:
    collecting user interactions with each application; and
    updating the relevance score of each application based on the user interactions.

3. The computer-implemented method of claim 1, wherein configuring a set of applications comprises:
    creating a JSON file for each application, the JSON file comprising the application, the one or more modules of the application, and site information; and
    merging the JSON file with a base deployment manifest JSON file to obtain a final consolidated manifest JSON file that is to be deployed to the on-premise edge devices of the on-premise system.

4. The computer-implemented method of claim 1, further comprising:
    transforming a data structure of the process flow and the collection of applications associated with each node into composed JSON files.

5. The computer-implemented method of claim 1, wherein a node included in the process flow comprises a collection of applications.

6. The computer-implemented method of claim 1, wherein a node included in the process flow comprises a workflow that includes a plurality of sub-processes, wherein a sub-process comprises a collection of applications.

7. The computer-implemented method of claim 1, wherein:
the relevance score of an application is determined based on a weighted combination of an access factor and an engagement factor,
the access factor of the application indicates a ratio of an access frequency of the application over a sum of the access frequencies of all of the set of applications, and
the engagement factor of the application indicates a ratio of meaningful transactions within the application over a sum of meaningful transactions within all of the set of applications.

8. The computer-implemented method of claim 1, wherein the set of applications are categorized into a first set including applications having relevance scores satisfying a threshold, and a second set including applications having relevance scores not satisfying the threshold.

9. One or more non-transitory computer-readable storage media coupled to one or more processors and having instructions stored thereon which, when executed by the one or more processors, cause the one or more processors to perform operations comprising:
configuring a set of applications and one or more modules associated with each application, wherein the one or more modules of an application comprise functional components that are bundled into the application, wherein each application is associated with a site of an on-premise system where the application is to be deployed;
creating a process flow that includes a plurality of nodes, each node corresponding to a process executed at the site;
associating a collection of applications to each node included in the process flow, wherein the collection of applications are selected from the set of applications, wherein the set of applications are categorized based on a relevance score of each application; and
deploying the process flow and the collection of applications associated with each node to corresponding on-premise edge devices of the on-premise system based on the site of each application.

10. The one or more non-transitory computer-readable storage media of claim 9, wherein the operations further comprise:
collecting user interactions with each application; and
updating the relevance score of each application based on the user interactions.

11. The one or more non-transitory computer-readable storage media of claim 9, wherein configuring a set of applications comprises:
creating a JSON file for each application, the JSON file comprising the application, the one or more modules of the application, and site information; and
merging the JSON file with a base deployment manifest JSON file to obtain a final consolidated manifest JSON file that is to be deployed to the on-premise edge devices of the on-premise system.

12. The one or more non-transitory computer-readable storage media of claim 9, wherein the operations further comprise:
transforming a data structure of the process flow and the collection of applications associated with each node into composed JSON files.

13. The one or more non-transitory computer-readable storage media of claim 9, wherein a node included in the process flow comprises a collection of applications.

14. The one or more non-transitory computer-readable storage media of claim 9, wherein a node included in the process flow comprises a workflow that includes a plurality of sub-processes, wherein a sub-process comprises a collection of applications.

15. The one or more non-transitory computer-readable storage media of claim 9, wherein:
the relevance score of an application is determined based on a weighted combination of an access factor and an engagement factor,
the access factor of the application indicates a ratio of an access frequency of the application over a sum of the access frequencies of all of the set of applications, and
the engagement factor of the application indicates a ratio of meaningful transactions within the application over a sum of meaningful transactions within all of the set of applications.

16. The one or more non-transitory computer-readable storage media of claim 9, wherein the set of applications are categorized into a first set including applications having relevance scores satisfying a threshold, and a second set including applications having relevance scores not satisfying the threshold.

17. A system, comprising:
one or more processors; and
a computer-readable storage device coupled to the one or more processors and having instructions stored thereon which, when executed by the one or more processors, cause the one or more processors to perform operations comprising:
configuring a set of applications and one or more modules associated with each application, wherein the one or more modules of an application comprise functional components that are bundled into the application, wherein each application is associated with a site of an on-premise system where the application is to be deployed;
creating a process flow that includes a plurality of nodes, each node corresponding to a process executed at the site;
associating a collection of applications to each node included in the process flow, wherein the collection of applications are selected from the set of applications, wherein the set of applications are categorized based on a relevance score of each application; and
deploying the process flow and the collection of applications associated with each node to corresponding on-premise edge devices of the on-premise system based on the site of each application.

18. The system of claim 17, wherein the operations further comprise:
collecting user interactions with each application; and
updating the relevance score of each application based on the user interactions.

19. The system of claim 17, wherein configuring a set of applications comprises:
creating a JSON file for each application, the JSON file comprising the application, the one or more modules of the application, and site information; and
merging the JSON file with a base deployment manifest JSON file to obtain a final consolidated manifest JSON file that is to be deployed to the on-premise edge devices of the on-premise system.

20. The system of claim 17, wherein the operations further comprise:

transforming a data structure of the process flow and the collection of applications associated with each node into composed JSON files.

21. The system of claim 17, wherein a node included in the process flow comprises a collection of applications.

22. The system of claim 17, wherein a node included in the process flow comprises a workflow that includes a plurality of sub-processes, wherein a sub-process comprises a collection of applications.

23. The system of claim 17, wherein:
   the relevance score of an application is determined based on a weighted combination of an access factor and an engagement factor,
   the access factor of the application indicates a ratio of an access frequency of the application over a sum of the access frequencies of all of the set of applications, and
   the engagement factor of the application indicates a ratio of meaningful transactions within the application over a sum of meaningful transactions within all of the set of applications.

24. The system of claim 17, wherein the set of applications are categorized into a first set including applications having relevance scores satisfying a threshold, and a second set including applications having relevance scores not satisfying the threshold.

* * * * *